April 27, 1926.
A. W. BUCK
X-RAY FILM PACKET
Filed March 19, 1923
1,582,730
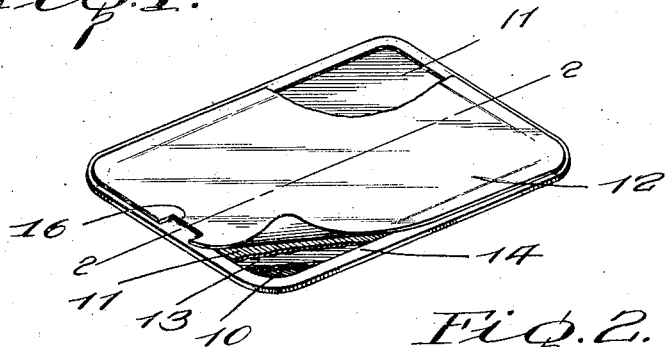
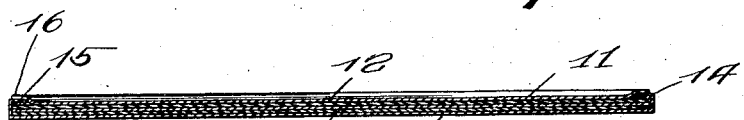
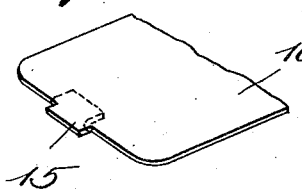
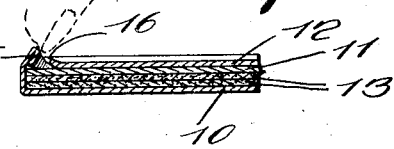
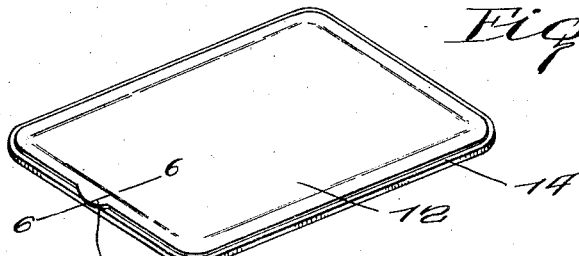
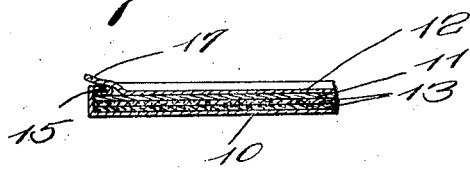
Inventor
Arthur W. Buck
By Watson E. Coleman
Attorney Patented Apr. 27, 1926.

1,582,730

UNITED STATES PATENT OFFICE.

ARTHUR W. BUCK, OF ST. LOUIS, MISSOURI.

X-RAY-FILM PACKET.

Application filed March 19, 1923. Serial No. 626,090.

*To all whom it may concern:*

Be it known that I, ARTHUR W. BUCK, a citizen of the United States, residing at St. Louis, State of Missouri, have invented certain new and useful Improvements in X-Ray-Film Packets, of which the following is a specification, reference being had to the accompanying drawings.

This invention comprehends certain new and useful improvements in film packets such as are designed especially for use in making X-ray negatives of the teeth, and it relates particularly to certain improvements in the X-ray film packet for which Letters Patent of the United States #1,293,323 were issued to me on February 4, 1919, this present application being a continuation in part of the application filed by me October 3, 1921, on X-ray film packets, Serial No. 505,160.

The packet covered by the patent above mentioned comprises an envelope consisting of a thin metallic back of relatively soft impressionable metal, and a front plate or facing of celluloid, paper, or any other suitable substance which is photographically opaque to ordinary light rays, the marginal edges of the back being bent over the facing and pressed tightly thereupon to hold the back and facing in close and secure relation to each other, and one or more disks or sheets of sensitized film being interposed and held securely between the impressionable metallic back and the facing. By "impressionable" in this case, as well as in the already issued patent above mentioned, is meant a substance which is flexible or pliable without elasticity so it may be bent under very slight pressure to take any desired curvature or conformation and will retain the bend given to it, thereby causing it to conform to the shape of the mouth.

The present invention has for its primary object to make the packet susceptible to being more easily opened, without rendering it liable to admit the ordinary light rays which would obviously "fog" the film and render it useless.

A further object is to provide means for indicating the place at which the thumb nail is to be inserted beneath the flange of the packet in order to open the packet.

I shall now describe the manner in which this result is accomplished, reference being had to the following description and accompanying drawings, in which:—

Figure 1 is a perspective view of a film packet constructed in accordance with my invention, the facing sheet being broken away to show the sheet immediately beneath and the facing sheet at one side being turned up to show the films and inner sheet in place;

Figure 2 is a longitudinal enlarged sectional view on the line 2—2 of Figure 1 of the completed packet;

Figure 3 is a fragmentary sectional view on the same line as Figure 2 but enlarged in scale to show the manner in which the packet may be opened;

Figure 4 is a perspective view of the metal sheet 10 looking toward the inside thereof, showing the lug 15 and the manner in which this lug is bent over to form the reinforced portion;

Figure 5 is a perspective view of a modified form of the construction shown in Figure 1;

Figure 6 is a sectional view on the line 6—6 of Figure 5.

Corresponding and like parts are referred to in the following description and designated in the accompanying drawing by corresponding reference characters.

The envelope of my improved film packet comprises, as in the patented structure, a thin metallic back of relatively soft impressionable metal, designated 10, a sheet, designated 11, which is of celluloid, paper or any other substance or material which would be photographically opaque to ordinary light rays, and an outer facing of paper, designated 12.

Interposed between the back 10 and the sheet 11 are one or more sensitized films, designated 13. In forming the packet, the films 13 are disposed upon the metal sheet 10, then the sheet 11 of paper, celluloid or other like material is disposed upon the outer faces of the films 13 and then the margin of the sheet 10 is bent over, as at 14, entirely around the margin of the sheet of paper 11. The outer facing 12, which, as before remarked, may be made of paper or any other suitable material which is photographically opaque to any ordinary light but which is ordinarily formed of black paper, is pasted or cemented upon the paper facing 11 over the entire surface of the paper facing, the margin of the sheet 12, however, extending over the inturned flange 14. This margin may be cemented to this margin or left free. Even with the best of cement it is ordinarily difficult to cause the margin of the outer facing 12 to adhere to the metal and, therefore, ordinarily the margin of this paper facing is only partially cemented to the inturned flange 14. The margin of the paper 12, however, projects over this inturned flange 14 sufficiently to prevent any entrance of light between the inturned flange 14 and the sheet 11 when the packet is bent, as it is when placing it in the mouth and causing it to conform to the teeth.

It is manifest that if the packet was manufactured without the waterproof paper facing 12 over the front thereof the turned-in edge or flange of the impressionable metal back would, when the packet was bent for convenient insertion into a patient's mouth and then subsequently straightened, have a tendency to bulge away from the paper over the film, thereby permitting light to enter the packet and fog the film, but this possibility is precluded by having the paper facing cemented entirely over the sheet 11 and extend over and overlap the turned-in marginal flanges or edges of the back 10.

As illustrated in my original patent previously referred to, the flange 14 which is bent down over the outer facing sheet is difficult to open, as this flange is pressed down so tightly that it is difficult to get the thumb nail beneath the edge to open the packet. Hence, and in order to make the packet more readily opened, I have formed one end of the metal sheet 10 which forms the back with a lug 15 which is bent in upon the back, as illustrated in Figure 4, to produce a double thickness of metal at this point. This double fold of metal 15 is relatively easy to lift up with the thumb nail. This double fold 15 is placed at the end of the packet, as it is more convenient than at the side of the packet. Furthermore, in bending the packets for use the greatest bend is on the side or long edge of the packet rather than on the end of the packet, and as the double fold on the side would interfere to a certain extent with bending the packet I have disposed the double fold on one end.

This double fold is not obvious to the operator, particularly in the dark room, and in order to show the operator precisely where this double fold is located, I form the outer facing sheet 12 with an indicating means. Thus in Figure 1 this outer facing is cut away at 16, exposing the point where the double fold 15 is located, which can be readily lifted up and the packet opened at this point, (see Figure 3).

In Figure 5, I show another form of indicating means and in this case the outer facing 12 is formed at that end which overlaps the double fold 15 with a tab 17. This is particularly convenient in the dark room, as the operator can readily catch this little tab between the thumb and forefinger and strip it back, thereby exposing the folded under edge of the packet, or the operator can simply slip his thumb nail underneath the tab, knowing that it will hook onto the double fold and thereby open the packet. I do not wish to be limited to these two ways of indicating this double fold, as other means might be used for this purpose without departing from the spirit of the invention as defined in the appended claims.

Not only does this double fold form means whereby the flange 14 may be more readily lifted at this point, but in the form of my invention illustrated in Figure 1 there is a tendency of the metal when it is bent and afterwards straightened in taking dental radiograms to expand and bulge up through the opening or recess 16, thereby permitting light to enter the packet and fog the film, but this is provided against by forming the packet 10 with the outstanding tongue or lug 15 bent inward to form the double thickness, which makes the metal at this point of sufficient strength to stand the strain of bending without expanding. This construction prevents the metal flange of the packet from raising up through the opening 16 in the facing which would tend to permit the light to enter. Furthermore, the outer facing 12, overlapping as it does the inner edge of the flange, also acts to prevent any light from entering if this flange bulges up at any point due to bending or flexing the packet From the foregoing description in connection with the accompanying drawing, it will be seen that I have provided a very simple and efficient X-ray film packet which provides convenient means whereby the operator may open it, while at the same time there is no tendency at all for the metal back, upon being bent or conformed to the mouth and subsequently straightened, to bulge up away from the paper facing so that the ordinary light rays are positively precluded from entering the film, and at the same time I have preserved all of the original advantages as set forth in my Patent #1,293,323.

I claim:—

1. An X-ray film packet comprising a back of soft impressionable metal, a sheet of substance opaque to visible rays, a photographic film interposed between the back and sheet, the back being turned over around its margins onto the front sheet to hold the front sheet and back engaged, one portion of the turned-over margin being double in thickness whereby to form a portion which is more readily opened than any other portion of the turned-over margin, a sheet of material opaque to visible rays attached to the face of the front sheet and extending over the turned-over margin of the back so as to thereby prevent the entrance of light to the photographic film when the packet is flexed, and means on the last named sheet for indicating that portion of the turned-over margin which is most easily opened.

2. An X-ray film packet comprising a back of soft impressionable metal, a sheet of substance opaque to visible rays, a photographic film interposed between the back and sheet, the back having its entire margin overturned, the said inturned margin at one point having a double-backed portion terminating inward of the side wall of the packet and being disposed entirely within the lines defined by the outer and inner edge of the turned-over margin, said double-backed portion being less impressionable than the remaining portions of the margin whereby this double-backed portion may be more easily lifted to open up the packet.

3. An X-ray film packet comprising an envelope embodying a back of soft impressionable metal, a front sheet of thin flexible material photographically opaque to visible rays, a photographic film disposed between the back and front sheets, the back being formed of inturned marginal flanges extending over the front sheet, one flange of the back having a reinforced portion at one point to thereby permit the flange at this point to be raised to release the photographic film, and an outer facing sheet of flexible material attached to the front sheet the margins of the sheet extending over the outer faces of all of said flanges, the outer sheet at a point adjacent the reinforced portion of the flange being formed to indicate the position of this reinforced portion.

4. An X-ray film packet comprising an envelope embodying a back of soft impressionable metal, a sheet of flexible material photographically opaque to visible rays, a photographic film disposed between the back and sheet, the back being formed with inturned marginal flanges extending over the sheet, one flange of the back having an inwardly projecting lug which is inturned upon the under face of the corresponding flange to form a reinforced portion whereby the flange may be raised to permit the release of the film, and a facing attached to the sheet and extending over said flanges except at said reinforced portion.

5. An X-ray film packet comprising an envelope embodying a back of soft impressionable metal, a sheet of thin flexible material photographically opaque to visible rays, a photographic film disposed between the back and sheet, the back being formed with inturned marginal flanges extending over the sheet, one of said flanges being formed with a lug turned under between the flange and the inner face of the back whereby the flange at this point has a double thickness, and a facing extending over and being secured to the outer faces of said flanges, said facing coincident with the inturned lug being so formed as to indicate the position of this lug.

6. An X-ray film packet comprising an envelope embodying a back of soft impressionable metal, a sheet of thin flexible material photographically opaque to visible rays, a photographic film disposed between the back and said sheet, the back being formed with inturned marginal flanges engaging the sheet at its margin, and a facing extending over and covering said sheet and secured to the outer face of said sheet, the margins of the facing extending over the flanges, the facing being formed in one margin with an inwardly extending recess and one flange of the back having an inwardly projecting lug seated in said recess and normally filling said recess.

7. An X-ray film packet comprising a back of soft impressionable metal, a sheet of substance opaque to visible rays, a photographic film interposed between the back and sheet, the back having its entire margin turned over upon the sheet and in tight contact therewith, said inturned margin at one point having a double-backed portion less impressionable than the remaining portion of the margin whereby this double-backed portion may be more easily lifted to open up the packet, and a facing sheet of thin material attached to the first named sheet and having its margin extending over the inturned margin of the back, the front sheet being unattached to that portion of the inturned margin where the double-backed portion is located, said facing sheet being formed adjacent the double-backed portion with a tangible indicating portion.

8. An X-ray film packet comprising a back of soft impressionable metal formed with inturned marginal flanges, and a facing of thin flexible material photographically opaque to visible rays and extending over the inner face of said back and upon the flanges thereof, and a photographic film disposed between the back and facing, said facing being formed on one edge with a recess and the back having a portion of its flange doubled beneath itself and seated in said recess, as and for the purpose set forth.

9. An X-ray film packet comprising a back of soft impressionable metal, a facing of thin flexible material photographically opaque to visible rays, the back being formed with a marginal inturned flange, and a photographic film disposed between the back and facing, the facing being cemented in position over its entire area and extending over and upon said flange and being formed on one edge with a recess, a portion of the flange of said back being turned upon itself for reinforcement and accommodated in said recess whereby to form a reinforced portion engageable by the thumb nail of the operator for convenience in opening the packet.

10. An X-ray film packet comprising an envelope embodying a back of soft impressionable metal, a facing of thin flexible material photographically opaque to visible rays, and a photographic film disposed between the back and facing, the back being formed with inturned marginal flanges and the facing extending over and covering the photographic film and having its margins secured over the outer faces of said flanges, the facing being formed in one margin with an inwardly extending recess and one flange of the back having an inwardly projecting lug seated in said recess and normally closing the recess.

11. An X-ray film packet comprising an envelope embodying a back of soft impressionable metal, a sheet of flexible material photographically opaque to visible rays, a photographic film disposed between the back and sheet, the back being formed with inturned marginal flanges extending over the sheet, one flange of the back having an inwardly projecting lug which is inturned upon the under face of the corresponding flange to form a reinforced portion whereby the flange may be raised to permit the release of the film, and a facing attached to said sheet and extending over said flanges except at said reinforced portion.

In testimony whereof I hereunto affix my signature.

ARTHUR W. BUCK.